United States Patent [19]
Domenicali et al.

[11] 4,201,473
[45] May 6, 1980

[54] OPTICAL INTERFEROMETER SYSTEM WITH CCTV CAMERA FOR MEASURING A WIDE RANGE OF APERTURE SIZES

[75] Inventors: Peter L. Domenicali, Madison; George C. Hunter, Middletown, both of Conn.

[73] Assignee: Zygo Corporation, Middlefield, Conn.

[21] Appl. No.: 898,945

[22] Filed: Apr. 21, 1978

[51] Int. Cl.² ............................................... G01B 9/02
[52] U.S. Cl. .................................................... 356/360
[58] Field of Search ...................... 356/345, 359, 360

[56] References Cited
PUBLICATIONS

Tropel (Brochure), "Model 4000 Vertical Interferometer," Tropel, 1000 Fairport Park, Fairport, N.Y. 14450.

*Primary Examiner*—John K. Corbin
*Assistant Examiner*—Scott J. Sugarman
*Attorney, Agent, or Firm*—Milton Zucker

[57] ABSTRACT

Apparatus is disclosed for the generation and display of interference patterns for the purpose of quantifying the distortion of either a surface or a transmitted wavefront. The invention comprises, in one embodiment, means to align the elements comprising the interferometer cavity, means to continuously magnify, i.e., zoom, the aperture diameter of the interference pattern, means to focus either the measured or limiting aperture onto the face of the vidicon, and means for transducing both the alignment spots and the interference pattern with a standard CCTV camera.

6 Claims, 4 Drawing Figures

OPTICAL INTERFEROMETER SYSTEM WITH CCTV CAMERA FOR MEASURING A WIDE RANGE OF APERTURE SIZES

BACKGROUND OF THE INVENTION

1. Field of the Invention

The present invention relates to apparatus for producing interference patterns commonly encountered in optical metrology. More particularly, the invention relates to apparatus for use in conjunction with either plano or spherical Fizeau or Twyman-Green type interferometers for the purpose of rapidly and accurately measuring the distortion of surfaces or transmitted wavefronts. No physical contact with the article under test is required.

2. The Prior Art

Interferometric testing has long been used in optical metrology. The advent of the laser has not only made interferometers more convenient to use but has also extended their range of application. Interferometry is used as a tool in fabrication, final testing, and system alignment, see for example, C. Zanoni, "Interferometry," *The Optical Industry and Systems Directory Encyclopedia*, v. 2, E137 (1977).

With the increased use of optical interferometers, there has been a corresponding need to provide the user with increased flexibility and versatility. For example, it is desirable to be able to conveniently and economically measure articles over a broad range of aperture sizes, i.e., typically from 16 mm to 100 mm diameter. Furthermore, it is imperative that the interferometer cavity be easily and quickly aligned to produce interference patterns. In addition, because of DHEW requirements on laser product viewscreens and the increasing use of video interference pattern evaluation apparatus, it is important for an interferometer system to have an integral CCTV camera to allow viewing the alignment spots and the interference pattern on a CCTV monitor.

Since Fresnel diffraction distorts the fringes at the edge of the aperture and since this phenomenon is particularly evident when small apertures are measured, it is important for an interferometer system to incorporate aperture focusing.

In many industrial applications, it is desirable to produce interference patterns with an interferometer system with the aforementioned capabilities. Prior art systems lack one or more of the above mentioned desirable features.

OBJECT OF THE INVENTION

It is the principal object of this invention to provide an improved optical interferometer system which meets the criteria above set forth.

STATEMENT OF THE INVENTION

In accordance with the instant invention, we provide an interferometer system capable of measuring a full range of test articles comprising (1) a source of a beam of coherent energy, most preferably a laser; (2) means for splitting the beam into a reference wavefront and a measurement wavefront; (3) means for interacting the reference wavefront with a reference surface and for interacting the measurement wavefront with the article under test; (4) means for then collecting the two wavefronts and focusing them as spots onto a diffuse screen containing an integral alignment reticle having a marked center; (5) means for viewing said diffuse screen and the spots focused thereon on the monitor of a closed circuit television system; (6) means for moving said spots relative to each other so that they coincide on the CCTV monitor at said marked center, thereby properly aligning the reference and measurement wavefronts to form an interference pattern; (7) means for removing the image of said diffuse screen from the monitor; (8) means for imaging the limiting aperture in the measurement region onto (9) means which destroys the coherence length of the light beam comprised of the recombined aligned reference and test wavefronts without producing any spurious patterns on the monitor; (10) means for providing variable magnification of the image on the means (9); and (11) means for focusing the image on the means (9) onto the vidicon face in the CCTV camera thereby providing a desirable interference pattern visible on the CCTV monitor.

Most preferably, the diffuse screen is provided with means for occulting the aligned focused spots, so that when one spot is much brighter than the other, the aligned brighter spot is occulted, so that the less bright spot will be clearly visible so that it can in turn be aligned.

Means (9) may be, for example, a second diffuse screen which is moving perpendicularly to the path of the wavefronts; the movement eliminates the appearance of any spurious patterns on the CCTV monitor's screen. Alternatively, it can be a non-moving liquid crystal of the dynamic scattering type.

THE DRAWINGS

DETAILED DESCRIPTION OF THE INVENTION

Figure 1:
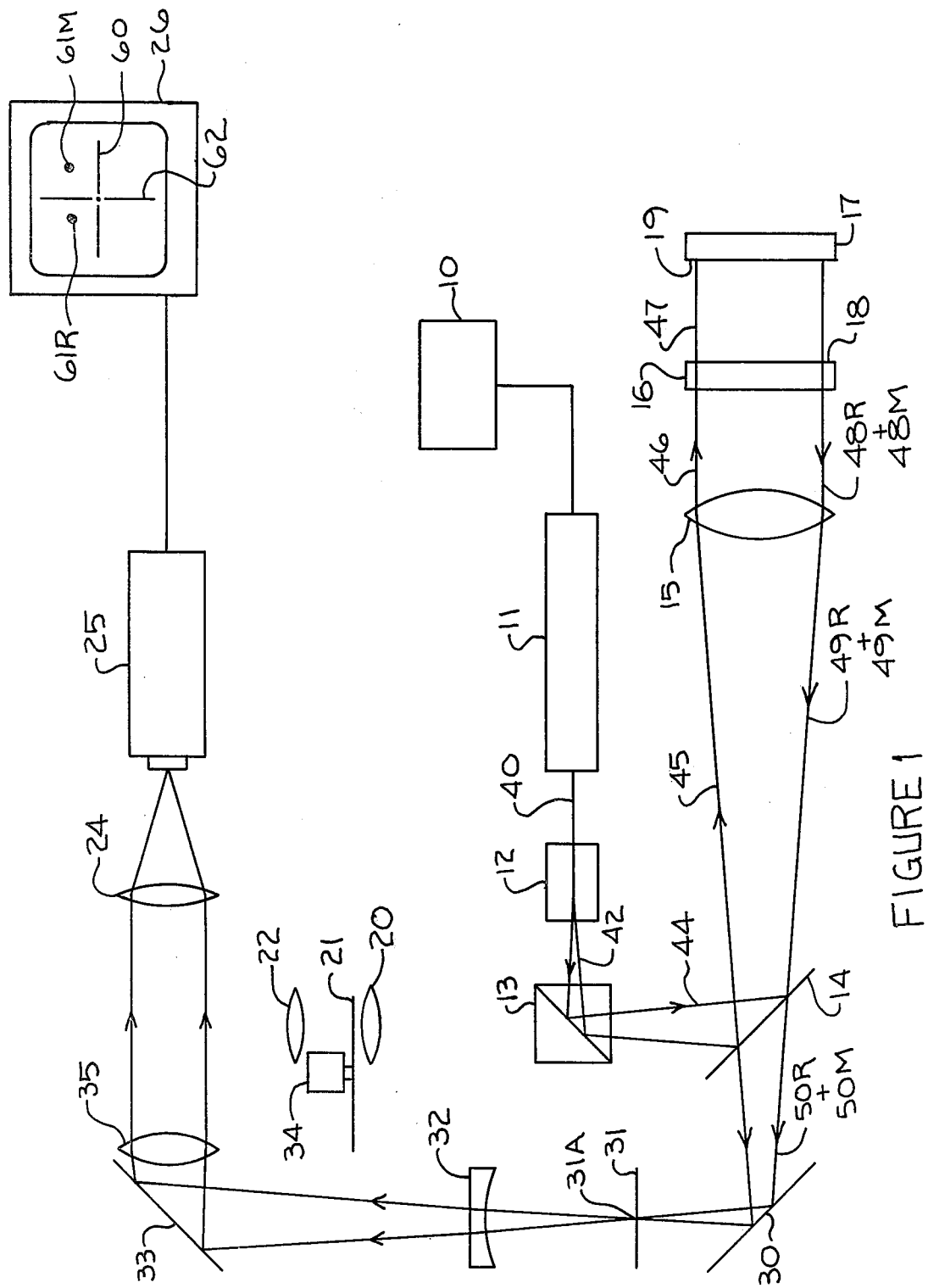
FIG. 1 is a schematic diagram of the instant invention in the alignment mode.

Description and explanation of FIG. 1

FIG. 1 is a schematic diagram of the instant invention in the alignment mode.

While the apparatus has application for a wide range of radiation sources, the following description is taken by way of example with respect to an optical measuring system. The term "radiant energy" as used herein includes, but is not limited to, electromagnetic energy of all frequency ranges.

A light source such as a tungsten bulb, xenon bulb, light-emitting diode, laser diode or other source of radiant energy, and most preferably a gas laser (11), provides optical energy for the narrow, nearly collimated beam (40). The power supply (10) energizes the laser (11). The spatial filter-beam diverger (12) converts beam (40) to a diverging spherical wavefront (42). The spatial filter-beam diverger (12), as is well known, uses an internal lens system and a small aperture located at the focus of the lens system to eliminate spurious beams and artifacts which are frequently found to accompany the principal output beam of a laser. The diverging spherical wavefront (42) is reflected by the partially reflective-partially transmissive surface of the beamsplitter cube (13) to produce wavefront (44). Beamsplitter cube (13) may have any of a variety of commercially available partially reflective-partially transmissive coatings; for example, the coating can be either a conventional 50-50 dielectric or it can be a polarization type beamsplitter coating used in conjunction with a phase retardation plate (not shown). Wavefront (44) is reflected by the partially reflective-partially transmissive surface of the plate type beamsplitter (14) to produce diverging wavefront (45) which collimating lens (15) converts to a plano wavefront (46). Optical elements (16) and (17), which comprise an interferometer cavity, are placed in the plano wavefront (46). FIG. 1 depicts a plano Fizeau-type interferometer; however, the apparatus of the instant invention is not limited to this type of interferometer. The apparatus of the instant invention is useful with a great variety of interferometer types, e.g. two beam and multiple beam Fizeau, plano and spherical type Fizeau and Twyman-Green, and Mach-Zehnder interferometers.

In FIG. 1, the plano wavefront (46) impinges on the partially reflective transmission element (16) which has a partially reflective, flat reference surface (18). The wavefront (48R) is the portion of wavefront (46) which is reflected by the reference surface (18). Wavefront (48R), hereafter denoted the reference wavefront, is collected by lens (15) to form the converging spherical reference wavefront (49R). The portion (47) of wavefront (46) which is transmitted by the reference surface (18) is denoted the measurement wavefront. If surface (19) of element (17) is the entity under test, then the portion of wavefront (47) reflected by surface (19) and transmitted by element (16) is the plano wavefront (48M) which is denoted the measurement wavefront after interaction with the article under test. This too is collected by lens (15) to form the converging measurement wavefront (49M). Portions of wavefronts (49R) and (49M) are transmitted by beamsplitter (14) to produce wavefronts (50R) and (50M). Wavefronts (50R) and (50M) are reflected by plano mirror (30). A diffuse screen (31) with an integral alignment reticle (31A) is placed at the focus of wavefronts (50R) and (50M). Lenses (32), (35), and (24) image the alignment reticle and the spots formed by the focused wavefronts (50R) and (50M) onto the face of the vidicon in CCTV camera (25). The images of the alignment reticle (62) and the spots (61R) and (61M) appear on the viewscreen of a CCTV monitor (26). Plano mirror (33) serves as a fold for a convenient layout.

The alignment reticle (31A) is preferably aligned to the interferometer apparatus using the method disclosed in Hunter, U.S. Pat. No. 3,844,660 issued Oct. 20, 1974. After being so aligned, its position is fixed. Other less desirable methods of alignment can be used, since this alignment is a one-time operation.

An element of the interferometer cavity is aligned with respect to the interferometer system, i.e., with respect to wavefront (46), by superposing its spot image onto the center of the image of the alignment reticle. For example, to align the reference surface (18) of element (16), (61R) is centered on (62). The motion of the spots is affected either by tilting a plano interferometer surface or by transverse translations of a spherical interferometer surface.

Following the aforementioned procedure, the second element of the interferometer cavity can be aligned similarly.

The sensitivity of the alignment system can be made such that the superposition of the reference and measurement spots yields easily visible interference fringes when the apparatus is in the viewing mode. The description of FIG. 3 explains the viewing mode.

DESCRIPTION AND EXPLANATION OF FIG. 2

Figure 2:
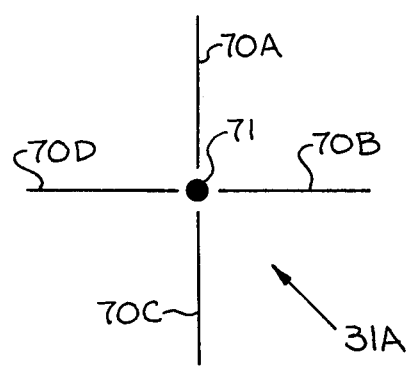
FIG. 2 is a schematic of a preferred embodiment of the alignment reticle.

FIG. 2 is a schematic of a preferred embodiment of the alignment reticle.

The alignment reticle (31A) is comprised of four lines (70A), (70B), (70C), and (70D) arranged in a cross pattern with an opaque circular dot (71) in the center. There is a space between the four lines (70A), (70B), (70C), and (70D) and the opaque central dot (71). Preferably, the lines are oriented along the tilt directions of the interferometer cavity element mounts. This alignment reticle can be placed on the screen (31) via either conventional photolithographic or silk screen processes. The purpose of the opaque central dot is to occult the reference or measurement spots when they are aligned. Therefore, the size of the opaque central dot is determined by the largest alignment spot which will be typically encountered. For a representative system, a nominal 0.75 mm diameter is suitable. This function is extremely important when using a multiple beam Fizeau interferometer cavity because the intensity of the reference alignment spot is about 100 times greater than that from the measurement alignment spot. Therefore, without the opaque central dot on the alignment reticle, the visibility of the measurement alignment spots is greatly reduced in the presence of the extremely bright reference alignment spot. Furthermore, a large intensity difference causes blooming and other undesirable effects in the CCTV system.

DESCRIPTION AND EXPLANATION OF FIG. 3

Figure 3:
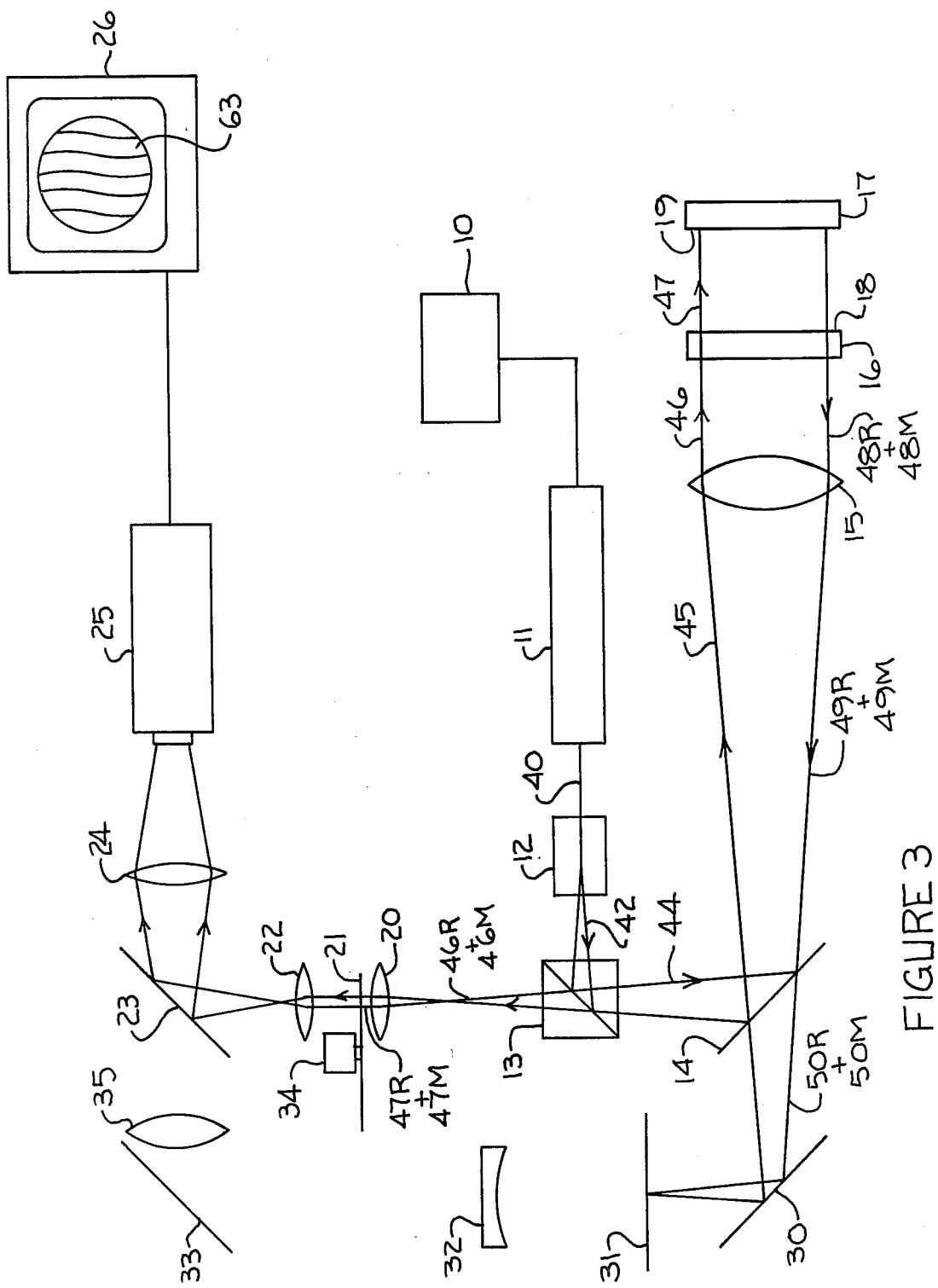
FIG. 3 is a schematic diagram of the instant invention in the interference fringe pattern viewing mode using a moving diffuse screen.

FIG. 3 is a schematic diagram of the instant invention in the interference fringe pattern viewing mode.

The description and explanation of FIG. 1 applies to FIG. 2 up to (49R) and (49M). In FIG. 3, the portions of wavefronts (49R) and (49M) reflected by beamsplitter (14) and transmitted by beamsplitter (13) as beams (46R) and (46M) are refracted by lens (20). Lens (20) is a focusing lens which can be moved axially to form an image of an aperture in the interferometer cavity on the diffuse screen (21). Screen (21) can be finely ground glass, finely ground plastic, or opal glass. Preferably diffuse screen (21) is mounted on an electromechanical transducer (34), such as a motor, so that it moves perpendicular to beams (47R) and (47M). The moving diffuse screen (21) serves two key functions: firstly, the diffuse structure of the screen will no longer appear as a spurious patten superimposed on the viewed interference pattern and, secondly, it essentially destroys the coherence length of the laser light to be imaged on the vidicon. If the laser coherence length is not destroyed at this point, serious problems are encountered with spurious interference effects produced by surface reflections from the imaging optic and in the face of the vidicon. These problems are particularly severe when variable magnification is incorporated in the viewing optics.

Lens (22) is a zoom lens which may be either specially designed or one of the commercially available camera or TV zoom lenses. Plano mirror (23) is a flip mirror which serves two purposes: firstly, it directs the output light of the zoom lens (22) through the subsidiary imaging lens (24) onto the vidicon of CCTV camera (25) and secondly, it blocks the light passing through the alignment leg, see FIG. 1, from impinging on the CCTV camera. Lens (24) images the screen (21) onto the face of the CCTV camera's (25) vidicon. The interference pattern (63) produced by the reference and measurement wavefront is visible on the CCTV monitor (26).

DESCRIPTION AND EXPLANATION OF FIG. 4

Figure 4:
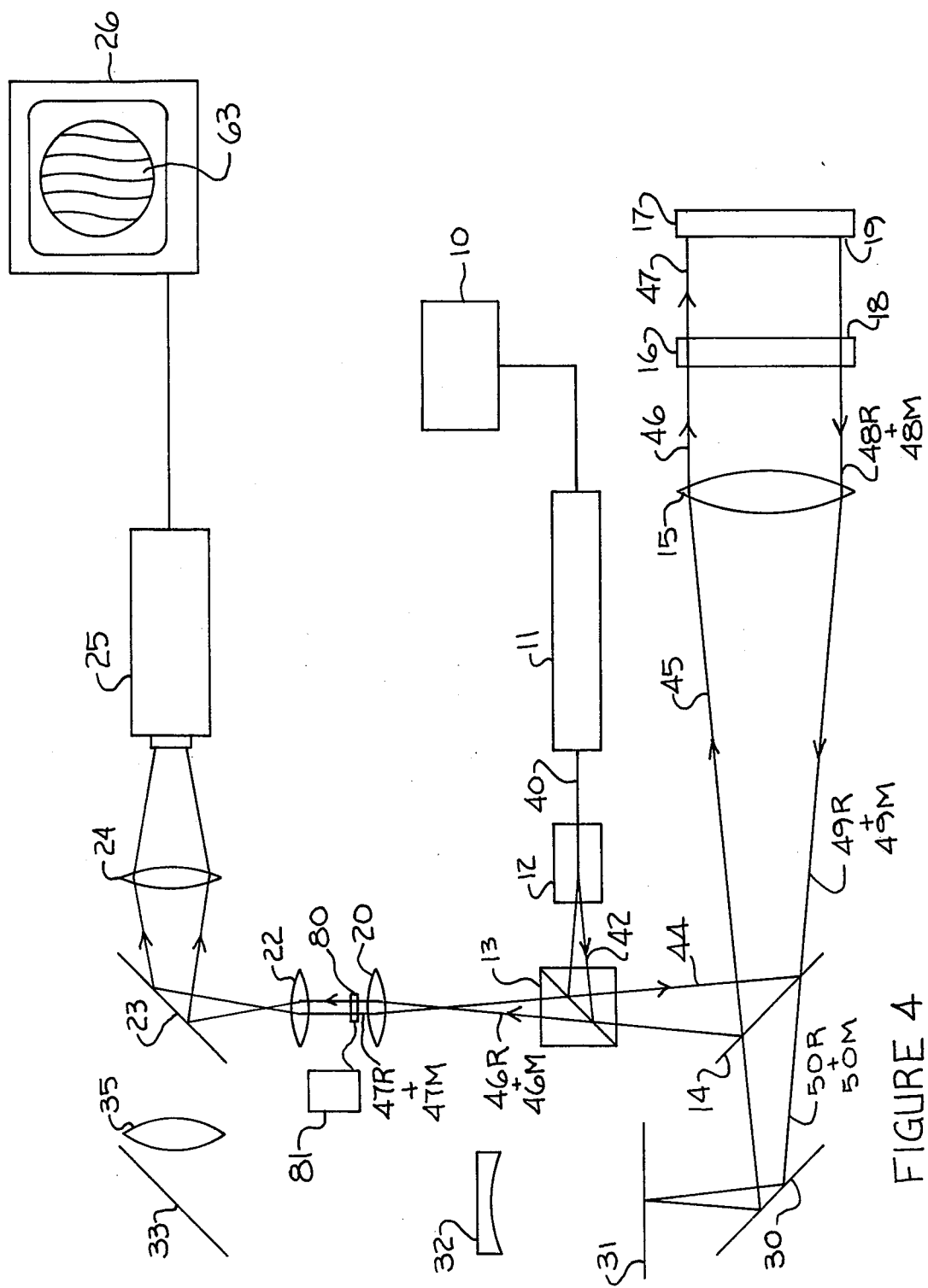
FIG. 4 is a schematic diagram of the instant invention in the interference fringe pattern viewing mode using a liquid crystal of the dynamic scattering type.

FIG. 4 is a schematic of the instant invention of the interference fringe pattern viewing mode using a liquid crystal of the dynamic scattering type. The moving diffuse screen (21) and the motor (34) of FIG. 3 have been replaced by a cell (80) containing a dynamic scattering liquid crystal and a source of electrical energization (81).

While only a Fizeau interference cavity is disclosed in the drawings, it is obvious that it can be replaced by other forms of interference cavities, which utilize reference and measurement wavefronts.

Obviously, changes can be made in the apparatus as described herein without departing from the scope of the invention as defined in the claims.

What is claimed is:

1. An interferometer system capable of measuring test articles over a broad range of aperture size comprising (1) a source of a beam of coherent energy, (2) means for splitting said beam into a reference wavefront and a measurement wavefront, (3) means for interacting said reference wavefront with a reference surface and said measurement wavefront with the article under test, (4) means for collecting said two wavefronts and focusing them as spots onto a diffuse screen containing an integral alignment reticle having a marked center, (5) means for viewing said diffuse screen and said spots focused thereon on a monitor of a closed circuit television system, (6) means for moving said spots relative to each other so they coincide on said monitor at said marked center, thereby properly aligning said reference and measurement wavefronts to form an interference pattern, (7) means for removing the image of said screen from said monitor, (8) means for imaging the limiting aperture in the measurement region onto (9) means which destroys the coherence length of the beam comprised of the recombined aligned reference and test wavefronts without producing any spurious patterns on said monitor, (10) means for providing variable magnification of the image on means (9), and (11) means for focusing said image of means (9) onto the vidicon of said closed circuit television system.

2. The system of claim 1, in which said means (9) is a diffuse screen moving continuously in a path perpendicular to that of said wavefronts.

3. The system of claim 1, in which said means (9) is a non-moving liquid crystal of the dynamic scattering type.

4. The system of claim 1, in which said diffuse screen includes means for occulting said spots at said marked center, whereby large differences in spot intensity do not interfere with proper alignment.

5. The system of claim 1, in which said source of said beam of coherent energy is a laser.

6. The system of claim 1, in which the means (10) for providing variable magnification is continuously variable.

* * * * *